(12) United States Patent
Massoulie et al.

(10) Patent No.: US 7,386,606 B2
(45) Date of Patent: Jun. 10, 2008

(54) SELF-ORGANIZING OVERLAY NETWORKS

(75) Inventors: Laurent Massoulie, Cambridge (GB); Anne-Marie Kermarrec, Rennes (FR); Ayalvadi Jagannathan Ganesh, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 4 days.

(21) Appl. No.: 10/698,846

(22) Filed: Oct. 30, 2003

(65) Prior Publication Data

US 2005/0060429 A1    Mar. 17, 2005

Related U.S. Application Data

(60) Provisional application No. 60/502,361, filed on Sep. 12, 2003.

(51) Int. Cl.
*G06F 15/177* (2006.01)
*G06F 15/173* (2006.01)

(52) U.S. Cl. .............. 709/221; 709/242; 709/243; 709/223

(58) Field of Classification Search .............. None
See application file for complete search history.

(56) References Cited

U.S. PATENT DOCUMENTS

| | | | | |
|---|---|---|---|---|
| 6,240,463 B1 * | 5/2001 | Benmohamed et al. | ..... | 709/238 |
| 6,795,399 B1 * | 9/2004 | Benmohamed et al. | ..... | 370/235 |
| 6,801,496 B1 * | 10/2004 | Saleh et al. | ......... | 370/221 |
| 6,845,091 B2 * | 1/2005 | Ogier et al. | ......... | 370/338 |
| 6,850,486 B2 * | 2/2005 | Saleh et al. | ......... | 370/218 |
| 6,856,627 B2 * | 2/2005 | Saleh et al. | ......... | 370/397 |
| 6,909,700 B1 * | 6/2005 | Benmohamed et al. | ..... | 370/255 |

OTHER PUBLICATIONS

Johnson, Vicki & Johnson, Marjory; "How IP Multicast Works" IP Multicast Initiative, Stardust Industries, 1995-1997; 8 pgs.

Lin, Meng-Jang; Marzullo, Keith; "Directional Gossip in a Wide Area Networks" European Dependable Computing Conference, Jun. 16, 1999, p. 1-14.

van Renesse, Robbert, Birman, Kenneth P., & Maffeis, Silvano; "Horus: A Flexible Group Communication System" Communications of the ACM, vol. 39, No. 4, Apr. 1996, pp. 76-83.

van Renesse, Robbert, Minsky, Yaron, & Hayden, Mark; "A Gossip-Style Failure Detection Service" IFIP Chapman & Hall, 1996, 16 pages.

Birman, Kenneth P.; Hayden, Mark; Ozkasap, Oznur; Xiao, Zhen; Budiu, Mihai; Minsky, Yaron; "Bimodal Multicast" ACM Transaction on Computer Systems, v. 17, No. 2, May 1999, pp. 41-88.

"Multicast Technologies Report Internet Engineering Task Force Activities" Aug. 24-28, 1998, pp. 1-15.

(Continued)

*Primary Examiner*—John B. Walsh

(57) ABSTRACT

In an unstructured overlay network, each node in the network periodically tests logical network links among neighboring nodes to determine whether the links should be reorganized. A Metropolis scheme is used to determine the probability with which the links are reorganized. This probability is computed based on the change in link costs and/or node degrees that would be effected by a proposed reorganization. The Metropolis scheme tends to maintain a consistency among the degrees of the nodes, thereby providing strong failure resilience.

28 Claims, 5 Drawing Sheets

OTHER PUBLICATIONS

Kermarrec, Anne-Marie; Massoulie, Laurent; Ganesh, A.J.; "Probabilistic Reliable Dissemination in Large-Scale Systems" Microsoft Research, Cambridge IEEE Trans. Parallel Distrib. Syst. 14(3): 248-258 (2003).

Eugster, P. Th.; Guerraoui, R.; Handurukande, S.B.; Kermarrec, A.-M.; Kouznetsov, P.; "Lightweight Probabilistic Broadcast" ACM Transactions on Computer Systems vol. 21, Issue 4 (Nov. 2003), pp. 341-374.

Chu, Y.-h., Rao, S. G., Zhang, H.; "A Case for End System Multicast"; Proceedings of the 2000 ACM Sigmetrics Intnt'l Conf. on Measurement and Modeling of Computer Systems, Santa Clara CA, 2000, pp. 1-12.

Ratnasamy, S., Francis, P., Handley, M., Karp, R., Shenker, S.; "A Scalable Content-Addressable Network" Proceedings of ACM SIGCOMM 2001, pp. 161-172.

Rowstron, A., Druschel, P.; "Pastry: Scalable, Decentralized Object Location and Routing for Large-Scale Peer-to-Peer Systems" Proceedings of the 18th IFIP/ACM International Conference on Distributed Systems Platforms, Heidelberg, Germany, Nov. 2001, 22 pgs.

Stoica, I., Morris, R., Karger, D., Frans Kaashoek, M., Balakrishnan, H.; "Chord: A Scalable Peer-to-Peer Lookup Service for Internet Applications" SIGCOMM Aug. 2001 San Diego CA, 12 pgs.

Zegura, E.W., Calvert, K., Bhattacharjee, S.; "How to Model an Interwork" Proceedings of IEEE Infocom '96, San Francisco, CA, 9 pgs.

Zhao, B.Y., Kubiatowicz, J., Joseph, A.D.; "Tapestry: An Infrastructure for Fault-Tolerant Wide-Area Location and Routing" Technical Report UCB/CSD-01-1141, University of California, Berkeley, Apr. 2001, 27 pgs.

Banerjee, S., Bhattacharjee, B., Kommareddy, C.; "Scalable Application Layer Multicast" SIGCOMM Aug. 2002, Pittsburgh, PA, 13 pages.

van Renesse, R., Birman, K. P., Vogels, W.; "Astrolabe: A Robust and Scalable Technology for Distributed System Monitoring, Management, and Data Mining" In ACM Transactions on Computer Systems (TOCS), Sep. 2001, pp. 1-43.

Newman, M.E.J.; "Random Graphs as Models of Networks" Santa Fe Institute, Feb. 2002, 35 pages.

Banerjee, S., Seungjoon, L., Bhattacharjee, B., Srinivasan, A.; "Resilient Multicast Using Overlays" ACM Sigmetrics 2003, San Diego, CA, Jun. 2003, 21 pages.

Ganesh, A. J., Kermarrec, A.-M., Massoulie, L.; "Peer-to-Peer Membership Management for Gossip-Based Protocols" IEEE Trans. Parallel Distrib. Syst. 14(3): 248-258 (2003).

* cited by examiner

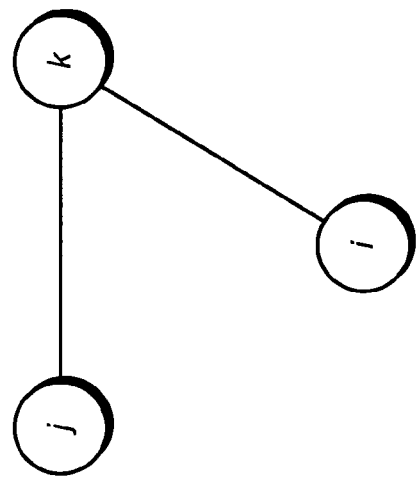
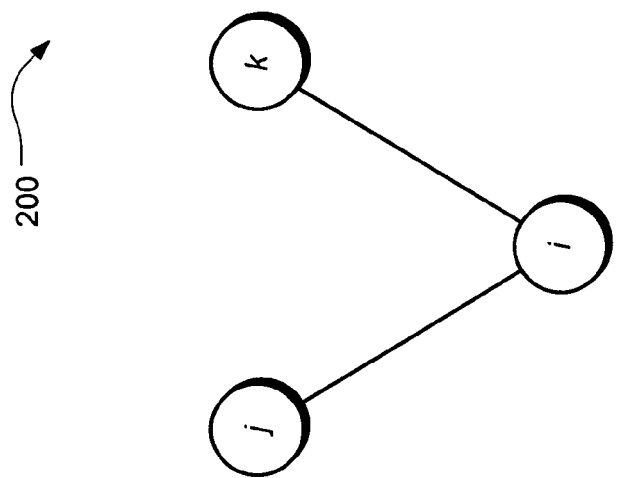
Fig. 2

SELF-ORGANIZING OVERLAY NETWORKS

RELATED APPLICATIONS

The application claims benefit of U.S. Provisional Patent Application No. 60/502,361, entitled "Self-organizing Overlay Networks", filed on Sep. 12, 2003, assigned to the same assignee as the present application, and specifically incorporated by reference herein for all that it discloses and teaches.

This application is related to U.S. patent application Ser. No. 09/992,862, entitled "Scaleable Message Dissemination System and Method", filed on Nov. 15, 2001, assigned to the same assignee as the present application, and specifically incorporated by reference herein for all that it discloses and teaches.

TECHNICAL FIELD

The invention relates generally to communication networks, and more particularly to self-organizing overlay networks.

DESCRIPTION

The growth of wide range peer-to-peer applications on the Internet motivates interest in general purpose overlay networks. A challenging research problem is to develop an overlay architecture that can support such applications without overloading network resources.

One approach taken with peer-to-peer networks includes a decentralized scheme that does not require global knowledge of network topology or membership and that is robust to node failures or disconnections. In an exemplary unstructured (i.e., minimally structured) overlay, nodes merely maintain a subset of other nodes' addresses (e.g., a neighbor list), without global naming or additional hierarchical structure. A basic use of such a simple unstructured overlay is to propagate information by flooding, which constitutes a basic building block of many peer-to-peer applications. For example, efficient multicasting can be supported, wherein the flooding is used to build suitable multicast trees.

However, existing approaches do not consider "geographic" locality or proximity, which is related to network load and communication delay. An additional issue is that neighbor lists may have widely varying sizes, which has detrimental effects on failure resilience.

Implementations described and claimed herein reduce network traffic and communication delays by reorganizing an overlay network based on a proximity metric or cost. In addition, improved resilience to failures can be achieved by maintaining neighbor lists of generally consistent sizes across the overlay. In addition, separate lists may be maintained to influence different routing effects. For example, maintaining a portion of a node's neighborhood in a list that is not reorganized can cause improved routing between distinct local regions in the overlay.

In various implementations, articles of manufacture are provided as computer program products. One implementation of a computer program product provides a computer program storage medium readable by a computer system and encoding a computer program.

The computer program product encodes a computer program for executing on a computer system a computer process that determines a first cost associated with a logical network link between an active node and a first neighboring node of the active node within an overlay network. A second cost associated with a proposed logical network link between the first neighboring node and a second neighboring node of the active node within the overlay network is also determined. The overlay network is reorganized to replace the logical network link with the proposed logical network link in the overlay network with a reorganization probability based on the first and second costs and the degrees of the nodes. The degree of a node generally refers to the size of its neighbor list (e.g., the number neighbors the node has).

In another implementation, a method is provided. A first cost associated I with a logical network link between an active node and a first neighboring node of the active node within an overlay network is determined. A second cost associated with a proposed logical network link between the first neighboring node and a second neighboring node of the active node within the overlay network is also determined. The overlay network is reorganized to replace the logical network link with the proposed logical network link in the overlay network with a reorganization probability based on the first and second costs and the degrees of the nodes.

In yet another implementation, a system is provided. A cost computing module determines a first cost associated with a logical network link between an active node and a first neighboring node of the active node within an overlay network. The cost computing module determines a second cost associated with a proposed logical network link between the first neighboring node and a second neighboring node of the active node within the overlay network. A reorganization module reorganizes the overlay network to replace the logical network link with the proposed logical network link in the overlay network with a reorganization probability based on the first and second costs and the degrees of the nodes.

Other implementations are also described and recited herein.

Brief descriptions of the drawings included herein are listed below.

FIG. 2 illustrates an exemplary reorganizing of arcs associated with nodes i, j, and k in an unstructured overlay.

In one implementation, nodes in an unstructured overlay network periodically test links among neighboring nodes to determine whether the links should be reorganized. Note that testing may be carried out by each node autonomously. Therefore, testing by distinct nodes need not be synchronized. A Metropolis scheme may be used to determine the probability with which logical links will be impacted by reorganization, although other optimization schemes are also contemplated. In addition to improving locality, the Metropolis scheme may be tailored to maintain a consistency among the degrees of the individual nodes, thereby providing strong failure resilience. Furthermore, separate neighbor lists may be maintained to influence different routing effects.

Figure 1:
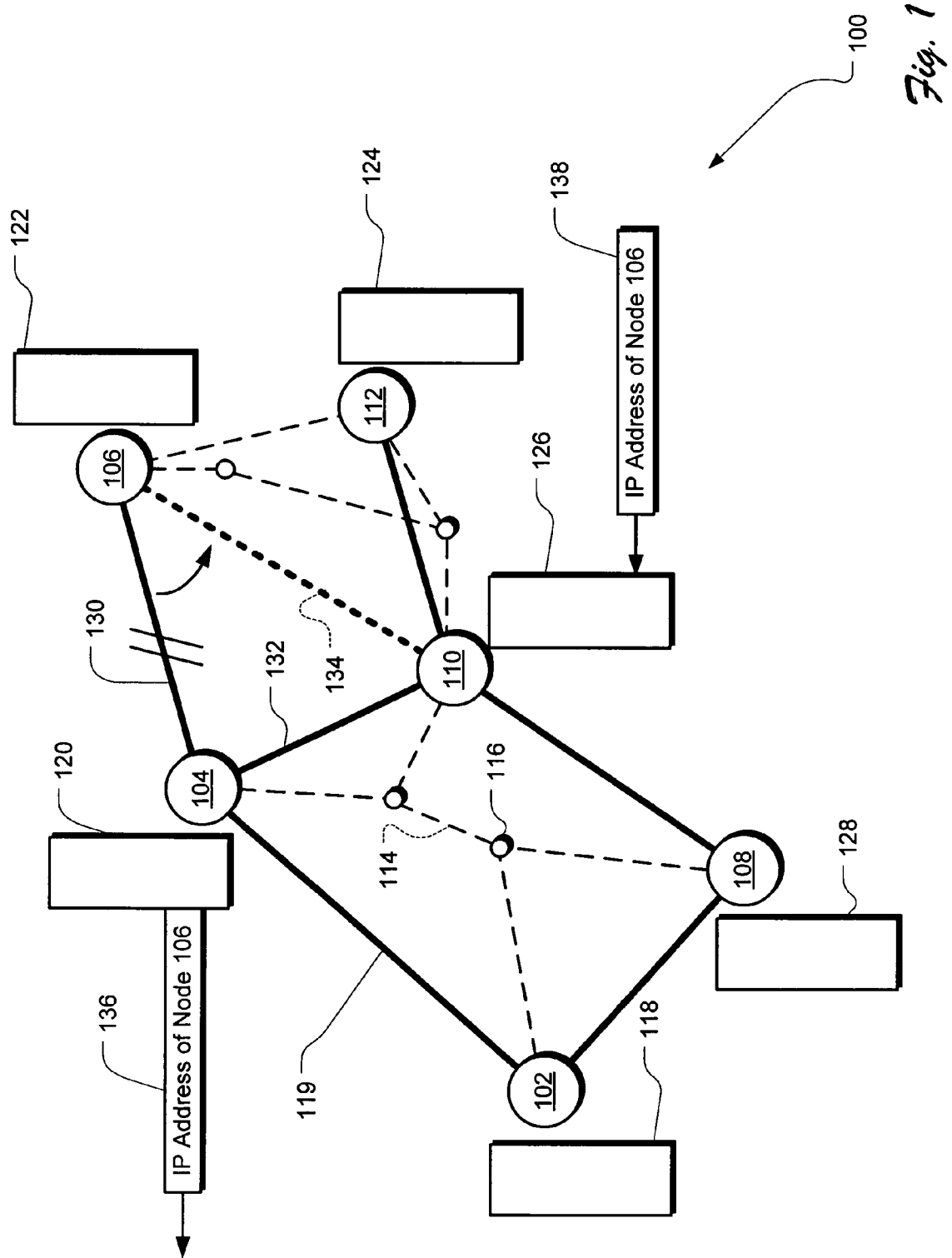
FIG. 1 illustrates an exemplary overlay network having self-organizing capabilities.

FIG. 1 illustrates an exemplary overlay network 100 having self-organizing capabilities. The network 100 includes nodes 102, 104, 106, 108, 112, and 110, which represent computing devices or resources on the network 100. Each node is connected by a physical network link (e.g., physical network link 114). Physical network links may include intermediary networking devices (e.g., intermediary networking device 116), such as routers, proxy servers, etc. Communications between overlay nodes are passed through such physical network links. It should be understood that additional physical network links (not shown) may also be coupled to each node.

An overlay node is also logically coupled to other overlay nodes by a logical network link (e.g., an undirected edge or arc 119). It should be understood that additional logical network links (not shown) may also be coupled to each node. A logical network link between two nodes specifies that these nodes are capable of communicating with each other, through one or more physical network links and intermediary devices. A single overlay node maintains at least a partial list of the IP (Internet Protocol) addresses of its "neighboring" overlay nodes, thereby establishing logical network links to the nodes in its list. Note that "neighboring" does not imply any sort of geographical locality or proximity in this context but merely denotes that the current node is "aware of" these neighboring nodes and knows how to contact them. Therefore, a directed edge (i,j) represents that node i "knows" node j.

Each logical network link is illustrated as "undirected" in FIG. 1; however, other logical network links (not shown) may be included between any two nodes in a single direction, effectively yielding a "directed edge" or arc. Existence of a directed logical network link is determined by whether the "source" node includes the IP address of a destination node in its neighbor list. As such, the existence of a logical link in one direction is independent of a logical link in the other direction.

In the illustrated system 100, the node 102 maintains a list 118, the node 104 maintains a list 120, the node 106 maintains a list 122, the node 108 maintains a list 124, the node 110 maintains a list 126, and the node 112 maintains a list 128. The solid line 130 represents a logical network link from the node 104 to the node 106, and the solid line 132 represents a logical network link from the node 104 to the node 110.

For the purpose of the description of FIG. 1, assume that node 104 becomes active, which occurs periodically for each node in the overlay. In an exemplary implementation, a local timer is reset after each reorganization attempt. When the local time expires, the node becomes an active node again and re-attempts a reorganization. The initial timer value may be set to a predetermined value T or it may be defined dynamically, either for each individual node or commonly for some or all nodes in the network. For example, the initial timer value may be randomly generated. An exemplary approach may include generating a random number r between 0 and 1, such that the initial timer value equals Tlog(1/r).

Therefore, the active node 104 initiates an attempt at reorganizing its logical network links. As illustrated, node 104 has logical network links to nodes 106 and 110. If the system determines that a reorganization is appropriate, as described below, the link 130 between nodes 104 and 106 may be deleted (see the hash marks "deleting" the link 130) and a new or proposed link 134 (see the new "dotted line" link) may be added between nodes 110 and 106. The reorganizing operation, for example, may be accomplished by extracting (see block 136) the IP address of node 106 from the list 120 of node 104 and sending it to node 110 for storage (see block 138) in the list 126 of node 110. The result is a reorganization of the overlay based on node 104.

FIG. 2 illustrates an exemplary reorganizing of arcs associated with nodes i, j, and k in an unstructured overlay. The notation used in FIG. 2 will be used in descriptions of algorithms below. As shown in the figure, node i has logical network links to nodes j and k. Therefore, a proximity metric can be represented by a cost c( ) of communication between i and j is referred to as c(i,j). In one implementation, the lower the cost, the more proximate the nodes are considered, although other proximity relationships are contemplated. For example, c(i,j) could include a ping time or a more complex measure incorporating bandwidth availability, the number of hops, etc. between i and j. Based on the self-organizing algorithm described in more detail below, the logical network link (i,j) may, for example, be replaced with a proposed logical network link (j,k).

Figure 3:
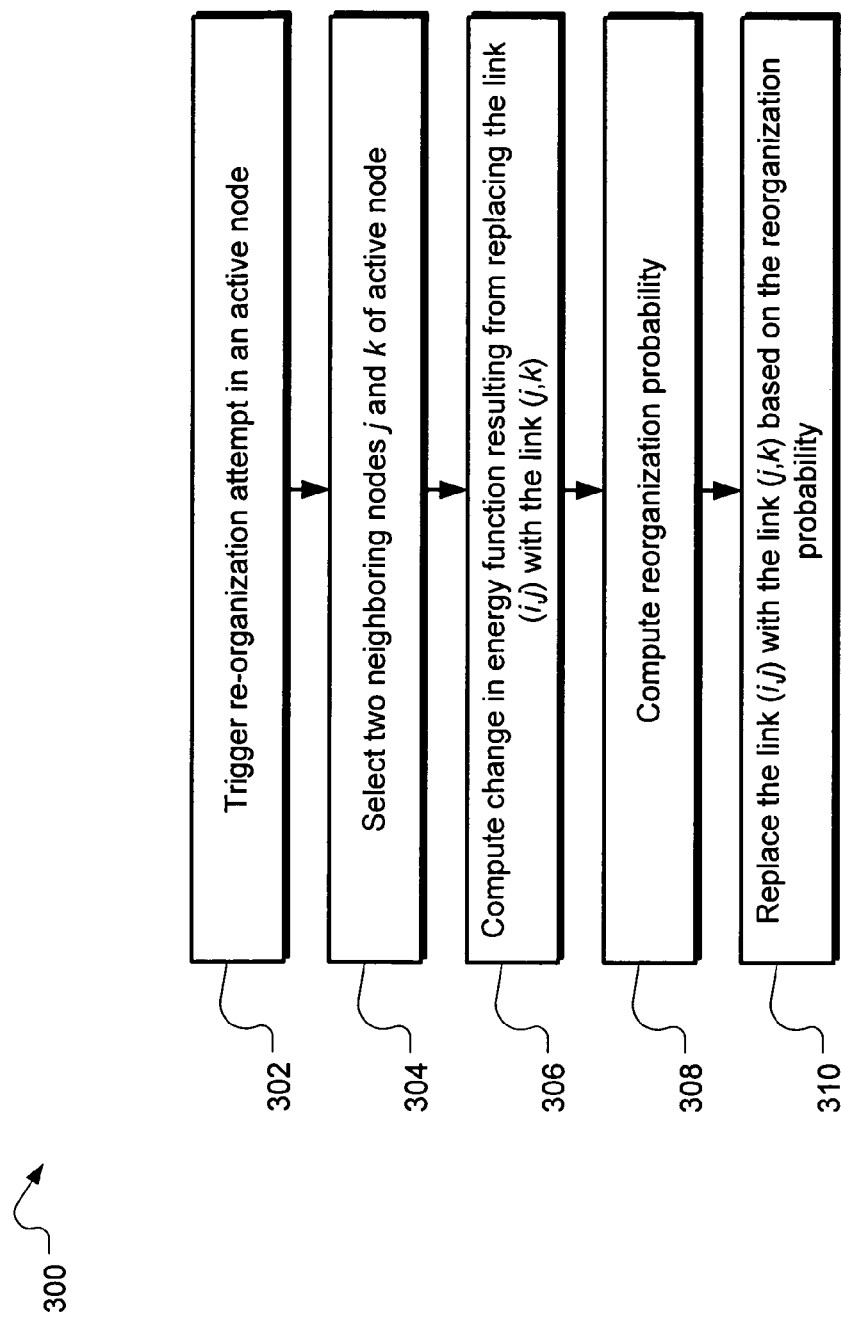
FIG. 3 illustrates exemplary operations for reorganizing arcs in an unstructured overlay.

FIG. 3 illustrates exemplary operations 300 for reorganizing arcs in an unstructured overlay. In a triggering operation 302, an attempt to reorganize logical network links of an active node i is initiated. For individual nodes, such triggering occurs periodically, irrespective of actions taken by other nodes. A plurality of neighboring nodes of the active node i, typically two nodes j and k, are selected from the neighbor list of the active node i, (i.e., using local information) in a selecting operation 304.

A computing operation 306 tests to determine whether the links among the nodes i, j, and k should be reorganized. In one implementation, a Metropolis algorithm (similar to simulated annealing at a fixed temperature) is used to determine whether to reorganize the overlay based on the current node, although other optimization schemes may be used. Each node i periodically, and at a unit rate, initiates communications with its selected neighbors j and k. Communication costs (such as a ping time) of the link (i,j) and the link (j,k) are collected. The node i computes the change in an energy function E(G) that would be brought about by replacing the link (i,j) with the link (j,k), using energy function E(G) and the change in energy function ΔE shown below:

$$E(G) = w \sum_{i \in V(G)} d_i^2 + \sum_{(i,j) \in E(G)} c(i, j) \qquad (1)$$

where the sum is taken over all vertices i and edges (i,j) in the graph G, w is a weight parameter, di is the degree of node i, and c(i,j) is a measure of the cost of communications between i and j; and $$\Delta E = 2w(d_k - d_i + 2) + c(j,k) - c(i,k) \qquad (2)$$

which can be computed locally without involving any other overlay member nodes. The nodes i, j, and k now effect the reorganization of the links among them with reorganization probability p that is computed in a probability operation 308, where $$p = \min\left(\left(e^{\frac{\Delta E}{T}} \frac{d_i(d_i - 1)}{d_j(d_j + 1)}\right), 1\right) \qquad (3)$$

and T is a parameter called "temperature". T is a parameter that trades off between how close the algorithm comes to the optimal solution and how quickly the algorithm arrives at a solution. It should be noted that changes that would increase the energy can still be made with a positive probability, which prevents the Metropolis scheme from getting stuck at local minima of the energy function. In reorganization operation 310, the reorganization occurs with a probability of p.

For example, in one implementation, a random number generator may be used to generate random numbers between 0 and 1. If a random number is generated that falls between 0 and p, then the reorganization is effected, such that the reorganization operation 310 replaces the link (i,j) with the link (j,k). Otherwise, the links are left unchanged.

Uniformly distributed locality-based reorganization can result in dense distributions of short arcs within individual localities of the overlay network. In an alternative implementation, a given number of links may be isolated or restricted from reorganization. For example, each node maintains two sets of links to neighbors. Links in one set are subject to re-organization as above, while links in the other set are not. Isolation from reorganization can yield nodes with long arcs that escape the proximate localities to reach other localities. These nodes will tend to provide "short-cut" arcs from one well-organized locality to another well-organized locality, enhancing the overall efficiency through the network.

In another aspect of self-organizing overlay networks, it is desirable to maintain communications among nodes even when an arc or node fails. By maintaining substantially consistent degrees for nodes in the overlay network, failure resilience is maintained. The first term, $w\Sigma d_i^2$, in the energy function E in Equation (1) ensures that the Metropolis scheme described herein tends to maintain substantially consistent degrees as all nodes.

Figure 4:
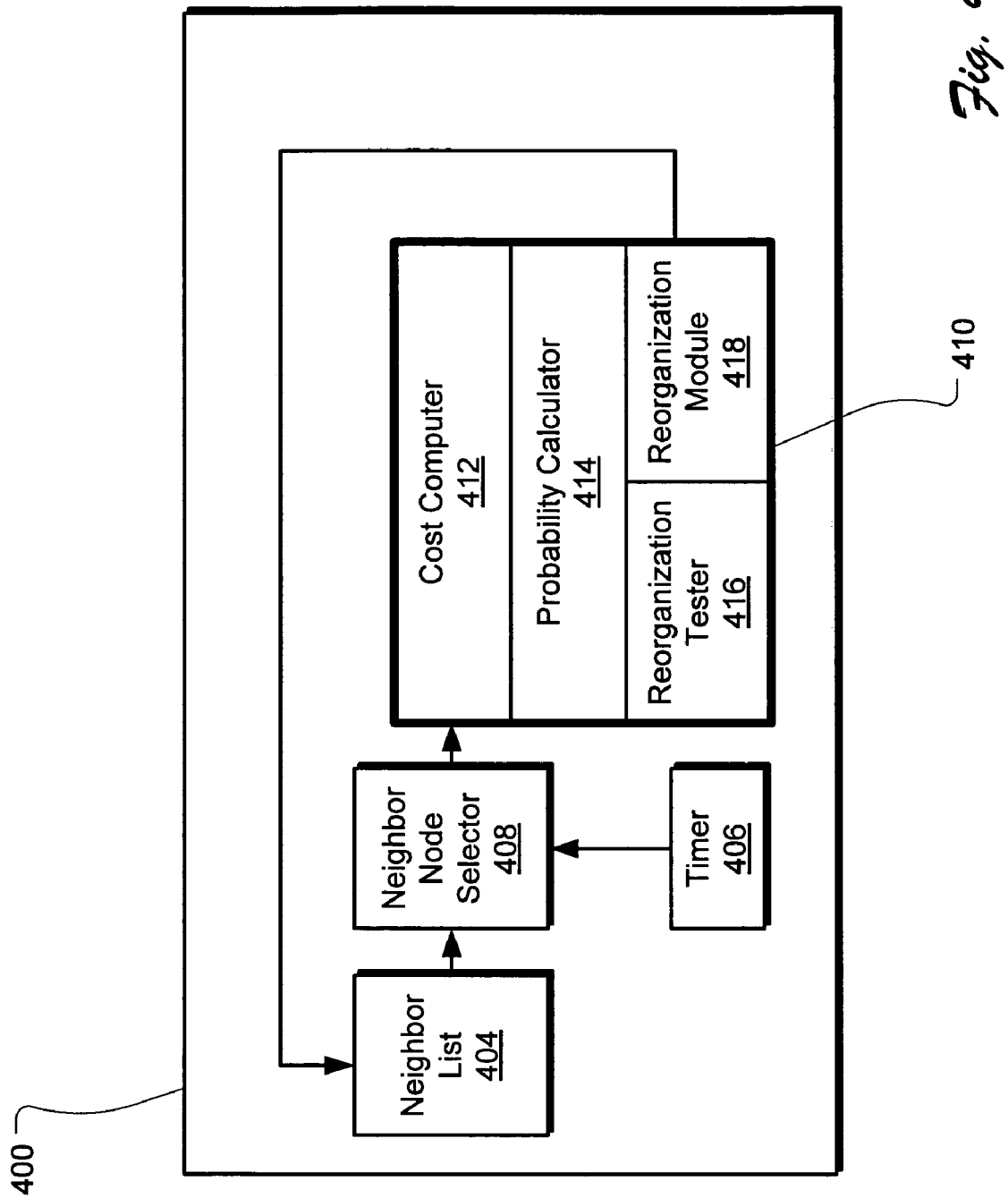
FIG. 4 illustrates an exemplary system for reorganizing arcs in an unstructured overlay.

FIG. 4 illustrates an exemplary node 400 capable of reorganizing arcs in an unstructured overlay. In an alternative implementation, the node 400 may be embodied in an independent reorganization component coupled with the overlay network, in a monolithic or distributed fashion.

A timer 406 triggers initiation of a reorganization attempt. A neighbor node selector 408 selects two or more neighbor nodes associated with the active node 400. For example, these neighbor nodes may be selected from a neighbor list 404 stored in the node 400 or in some other storage location accessible by the node 400.

An organization module 410 includes a cost computer 412 that computes the costs of the various links interconnecting the node and the selected neighbors. For example, the cost computer may cause the arcs (i,j) and (j,k) to be pinged (e.g., using the operating system ping primitive), where i is the current node and j and k are neighbors of node i, to obtain a round-trip time cost. Other costs may also be employed, as well as combinations of costs. More generally, the cost can be related to physical network characteristics and/or overlay/application characteristics. Other examples may include the physical network number of hops, which can be measured in the context of the Internet using ICMP packets. Alternatively, cost could be related to the reciprocal of the bottleneck capacity or spare capacity, which can be measured using existing tools. The cost may also be related to application-level measurements, such as the tree degree on each node in the context of an application-level multicast. The cost computer 410 also computes the change in energy of replacing the arc (i,j) with the arc (j,k).

A probability calculator 414 computes the reorganization probability to determine the likelihood of a reorganization occurring. A reorganization tester 416 determines whether reorganization should be performed based on the reorganization probability. A reorganization module 418 performs the reorganization on the overlay network if the reorganization tester 416 authorizes it. For example, if the reorganization tester 416 determines that reorganization should occur for nodes i, j, and k, the reorganization module 418 may delete the address of node k from node i's neighbor list 404, and send the address of node k to j for storage in the neighbor list of node j. In one implementation, the deletion of the address of node k from active node i"s neighbor list 404 happens after node i receives an acknowledgement from node j that the address of node k has indeed been incorporated into node j's neighbor list.

Figure 5:
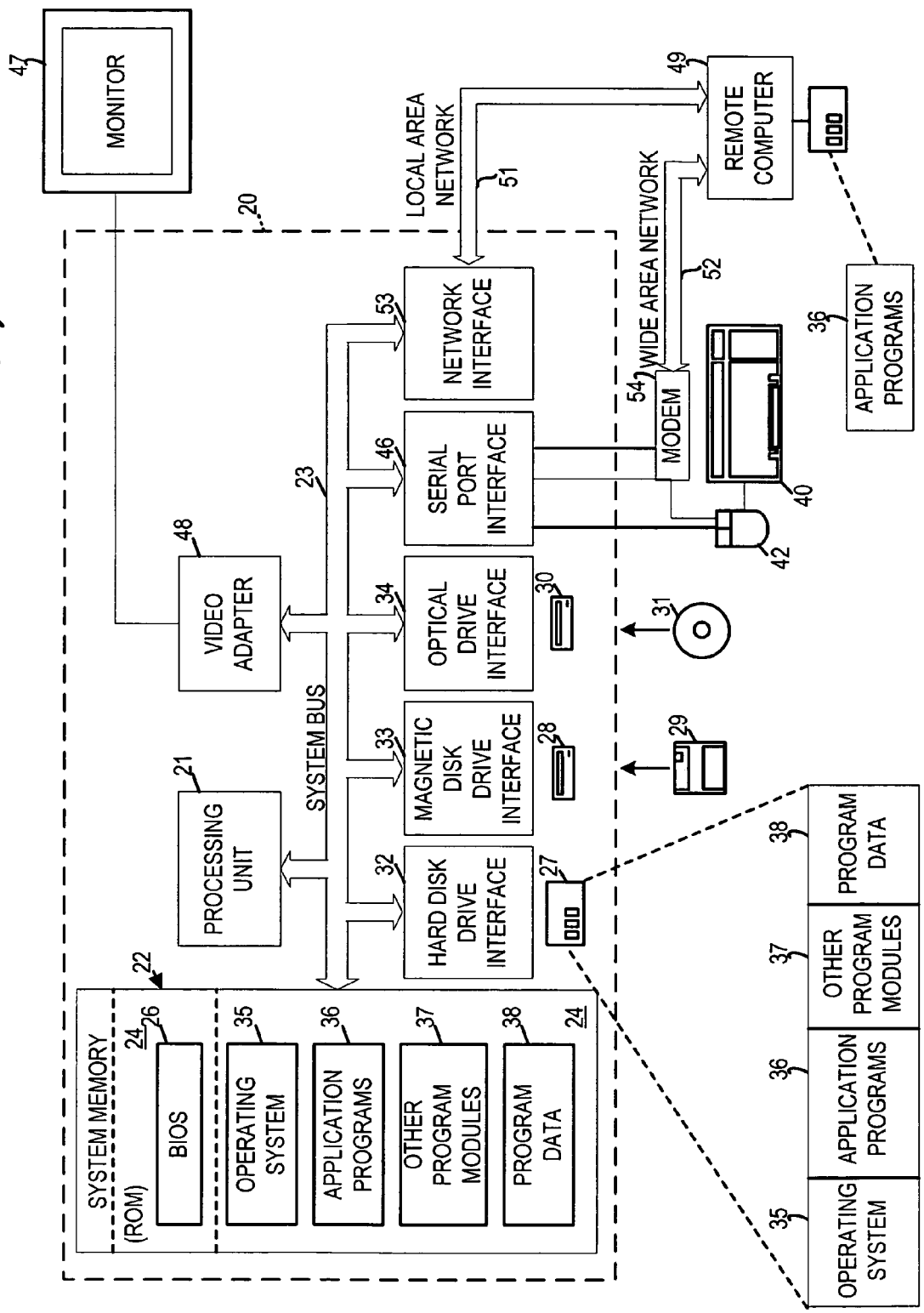
FIG. 5 illustrates an exemplary system useful for implementing an embodiment of the present invention.

The exemplary hardware and operating environment of FIG. 5 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 5. The logical connections depicted in FIG. 5 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an exemplary implementation, a neighborhood node selector, a cost computer, a timer, a probability calculator, a reorganization tester, a reorganization module, and other modules may be incorporated as part of the operating system 35, application programs 36, or other program modules 37. Timer parameters (e.g., T), costs, probabilities, and IP address lists (e.g., neighbor lists) may be stored as program data 38.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. A method comprising:
   determining a first cost associated with a logical network link between an active node and a first neighboring node of the active node within an overlay network, the active node and the first neighboring node communicating through one or more physical network links, the overlay network comprising nodes with application-level interconnections that form the overlay network, where the nodes exchange application-level communications via the interconnections, and where the application-level communications are transmitted via a data network that the logical network overlays;
   determining a second cost associated with a proposed logical-network link between the first neighboring node and a second neighboring node of the active node within the overlay network, the first neighboring node and the second neighboring node communicating through one or more physical network links; and
   reorganizing the overlay network by replacing the logical network link with the proposed logical network link in the overlay network, where the replacing includes comparing a random number with a reorganization probability, and where the reorganization probability is based on the first and second costs and the size of a neighbor list of the active node, the size of a neighbor list of the first neighboring node, and the size of a neighbor list of the second neighboring node.

2. The method of claim wherein the reorganization probability is dependent upon a change in an energy function caused by replacing the logical network link with the proposed logical network link in the overlay network.

3. The method of claim 1 wherein determining the first cost comprises:
   measuring a round trip delay time between the active node and the first neighboring node of the active node within the overlay network.

4. The method of claim 1 wherein determining the second cost comprises:
   triggering a measurement of a round trip delay time between the first and second neighboring nodes of the active node within the overlay network.

5. The method of claim 1 wherein determining the first cost comprises:
   determining an available bandwidth in the logical network link between the active node and the first neighboring node of the active node within the overlay network.

6. The method of claim 1 wherein determining the second cost comprises:
   determining available bandwidth in the proposed logical network link between the first and second neighboring nodes of the active node within the overlay network.

7. The method of claim 1 further comprising:
   randomly selecting the first neighboring node of the active node from a local address list of the active node.

8. The method of claim 1 wherein the overlay network is an unstructured overlay network.

9. The method of claim 1 further comprising:
   restricting a subset of neighboring nodes of the active node from reorganization.

10. A computer readable storage medium storing one or more modules for executing on a computer system, the one or more modules configured to perform a computer process, the computer process comprising:
    determining a first cost associated with a logical network link between an active node and a first neighboring node of the active node within an overlay network, the active node and the first neighboring node communicating through one or more physical network links, wherein the overlay network comprises a peer-to-peer network of nodes with respective IP addresses, where some nodes have links to other nodes, the links comprising the IP addresses of the corresponding nodes, where the nodes exchange application-level communications via the peer-to-peer network, and where the application level communications are transmitted via an IP network;

determining a second cost associated with a proposed logical network link between the first neighboring node and a second neighboring node of the active node within the overlay network, the first neighboring node and the second neighboring node communicating through one or more physical network links; and reorganizing the overlay network by replacing the logical network link with the proposed logical network link in the overlay network, where the replacing includes comparing a random number with a reorganization probability, and where the reorganization probability is based on the first and second costs and the size of a neighbor list of the active node, the size of a neighbor list of the first neighboring node, and the size of a neighbor list of the second neighboring node.

11. The computer readable storage medium of claim 10 wherein the reorganization probability is dependent upon a change in an energy function caused by replacing the logical network link with the proposed logical network link in the overlay network.

12. The computer readable storage medium of claim 10 wherein determining the first cost comprises:
measuring a round trip delay time between the active node and the first neighboring node of the active node within the overlay network.

13. The computer readable storage medium of claim 10 wherein determining the second cost comprises:
triggering a measurement of a round trip delay time between the first and second neighboring nodes of the active node within the overlay network.

14. The computer readable storage medium of claim 10 wherein determining the first cost comprises:
determining an available bandwidth in the logical network link between the active node and the first neighboring node of the active node within the overlay network.

15. The computer readable storage medium of claim 10 wherein determining the second cost comprises:
determining available bandwidth in the proposed logical network link between the first and second neighboring nodes of the active node within the overlay network.

16. The computer readable storage medium of claim 10 wherein the computer process further comprises:
randomly selecting the first neighboring node of the active node from a local address list of the active node.

17. The computer readable storage medium of claim 10 wherein the overlay network is an unstructured overlay network.

18. The computer readable storage medium of claim 10 wherein the computer process further comprises:
restricting a subset of neighboring nodes of the active node from reorganization.

19. A system comprising:
a cost computing module determining a first cost associated with a logical network link between an active node and a first neighboring node of the active node within an overlay network, the active node and the first neighboring node communicating through a data network through which the nodes exchange network communications, and determining a second cost associated with a proposed logical network link between the first neighboring node and a second neighboring node of the active node within the overlay network, the first neighboring node and the second neighboring node communicating through the data network, where logical network links comprise information that enables nodes to address network communications to other nodes; and a reorganization module reorganizing the overlay network by replacing the logical network link with the proposed logical network link in the overlay network, where the replacing includes comparing a random number with a reorganization probability, and where the reorganization probability is based on the first and second costs and the size of a neighbor list of the active node, the size of a neighbor list of the first neighboring node, and the size of a neighbor list of the second neighboring node.

20. The system of claim 19 wherein the reorganization probability is dependent upon a change in an energy function caused by replacing the logical network link with the proposed logical network link in the overlay network.

21. The system of claim 19 wherein the first cost includes a round trip delay time between the active node and the first neighboring node of the active node within the overlay network.

22. The system of claim 19 wherein the second cost includes a round trip delay time between the first and second neighboring nodes of the active node within the overlay network.

23. The system of claim 19 wherein the first cost includes available bandwidth in the logical network-link between the active node and the first neighboring node of the active node within the overlay network.

24. The system of claim 19 wherein the second cost includes available bandwidth in the proposed logical network link between the first and second neighboring nodes of the active node within the overlay network.

25. The system of claim 19 further comprising:
a neighborhood node selector randomly selecting the first neighboring node of the active node from a local address list of the active node.

26. The system of claim 19 wherein the overlay network is an unstructured overlay network.

27. The system of claim 19 wherein the first and second neighboring nodes of the active node are selected from a neighbor list maintained by the active node.

28. The system of claim 19 wherein the first and second neighboring nodes of the active node are selected from a neighbor list and further comprising:
an isolated neighbor list restricting a subset of neighbor nodes of the active node from reorganization.

* * * * *